Nov. 11, 1930.  L. E. LA BRIE  1,781,112
BRAKING SYSTEM
Filed Aug. 12, 1925  2 Sheets-Sheet 1

INVENTOR
LUDGER E. LA BRIE
BY M. W. McConkey
ATTORNEY

Nov. 11, 1930.  L. E. LA BRIE  1,781,112
BRAKING SYSTEM
Filed Aug. 12, 1925  2 Sheets-Sheet 2

INVENTOR
LUDGER E. LA BRIE
BY M. W. McConkey
ATTORNEY

Patented Nov. 11, 1930

1,781,112

UNITED STATES PATENT OFFICE

LUDGER ELIZE LA BRIE, OF SOUTH BEND, INDIANA, ASSIGNOR TO BENDIX BRAKE COMPANY, OF CHICAGO, ILLINOIS, A CORPORATION OF ILLINOIS

BRAKING SYSTEM

Application filed August 12, 1925. Serial No. 49,736.

This invention relates to brakes, and is illustrated as embodied in an automobile chassis having front wheel brakes and a transmission brake acting on the rear wheels. The invention is generally associated with means for utilizing a transmission brake as a servo device for applying brakes on dirigible wheels, forming the subject matter of my divisional application, Serial No. 462,472, filed June 20, 1930.

The transmission brake embodies a number of features of novelty, including a novel arrangement of three shoes acting on the propeller shaft, a very simple control arrangement including a shaft supported by the transmission, and other features which will be apparent from the following description of one illustrative embodiment of the invention shown in the accompanying drawings, in which.

Figure 1:
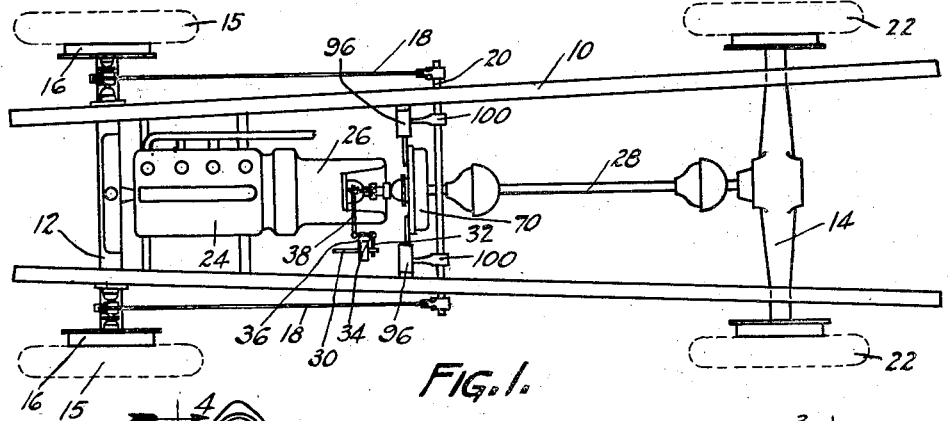
Fig. 1 is a top plan view of an automobile chassis, showing diagrammatically one possible arrangement.
Figure 2:
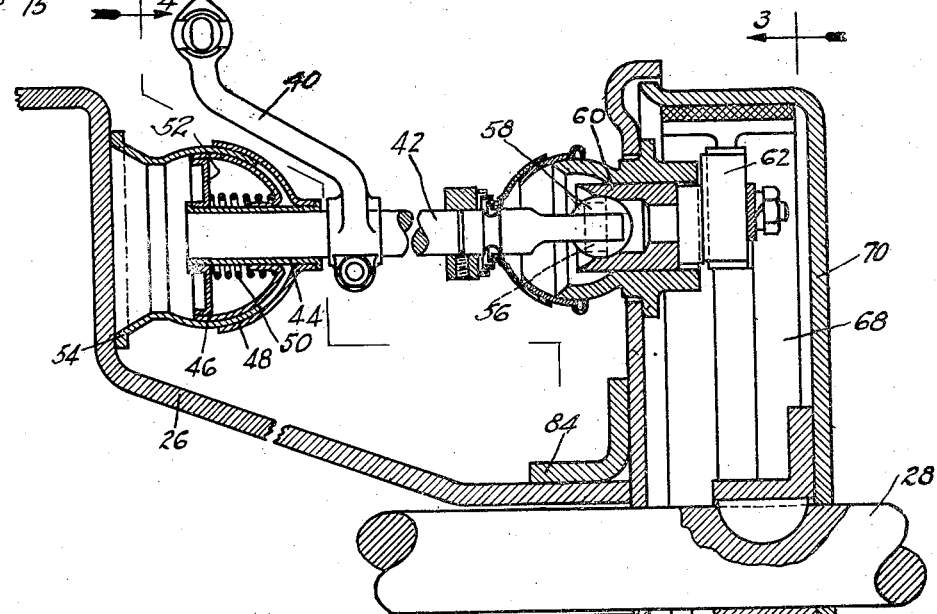
Fig. 2 is a vertical section longitudinally of the car through the transmission brake.
Figure 5:
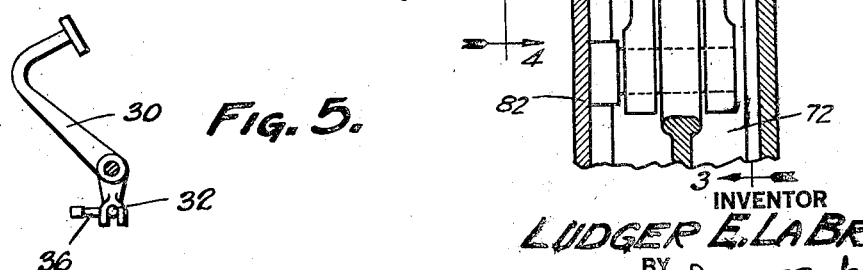
Fig. 5 is a side elevation of the brake pedal and its connections.
Figure 3:
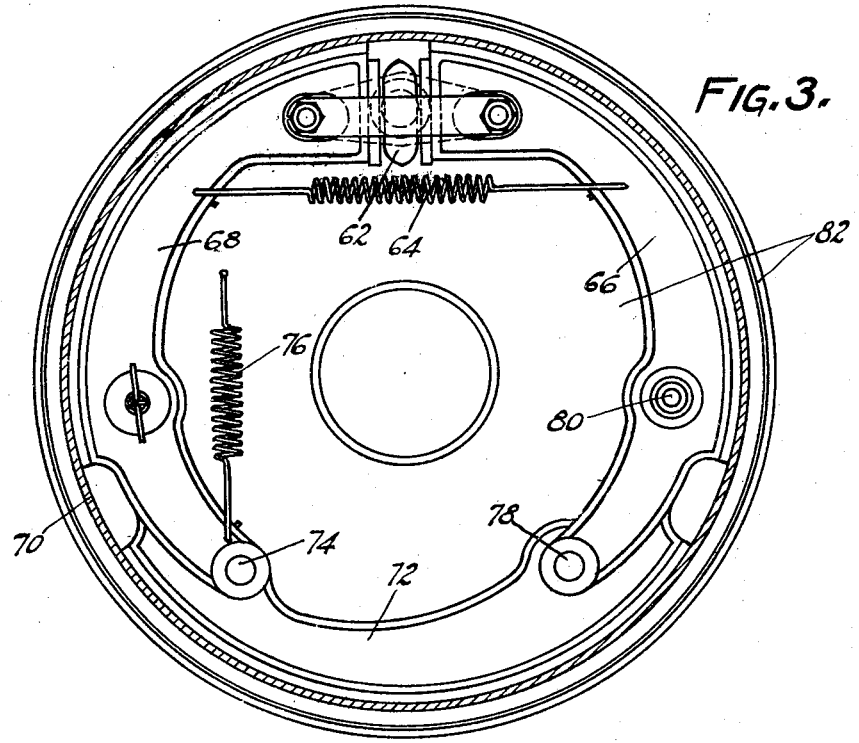
Fig. 3 is a vertical section on the line 3—3 of Fig. 2, showing the shoes in side elevation.
Figure 4:
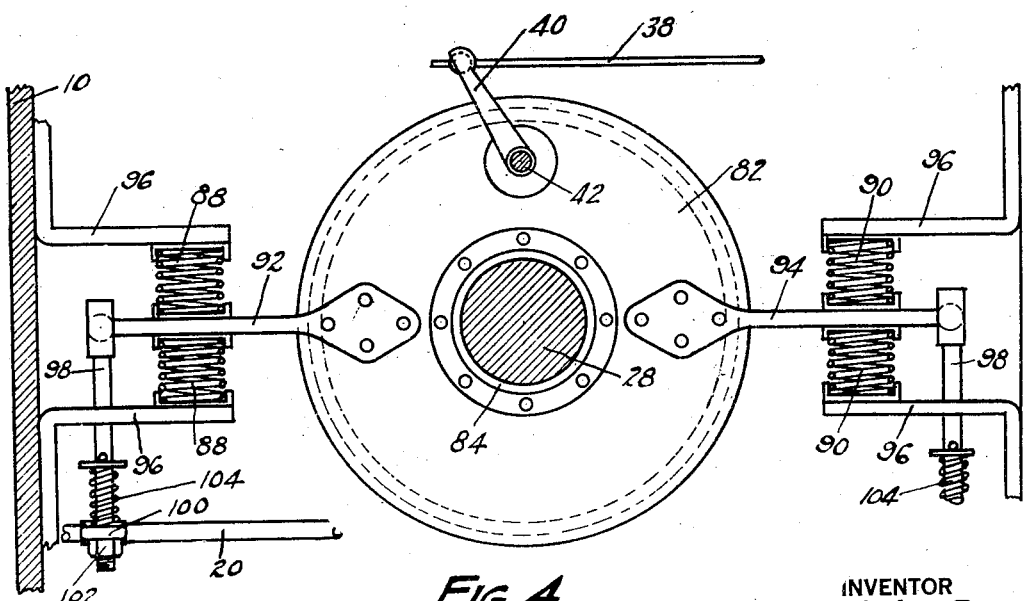
Fig. 4 is a vertical section on the line 4—4 of Fig. 2, showing the movement-limiting springs.

In the chassis diagrammatically shown in Fig. 1, a frame 10 is supported by the usual springs on a front axle 12 and a rear axle 14. The front wheels 15 have brakes 16 operated through brake rods 18 by rocking a cross shaft 20. The rear wheels 22 are driven from an engine 24 through a transmission 26 and propeller shaft 28. Except as further described below, these parts or their equivalents may be of any desired construction.

The brakes may be applied by any suitable device, a service pedal 30 being shown, and having one end below its fulcrum forked or slotted to embrace an arm 32 on a vertical shaft 34 having a crank 36 connected by a link 38 to an arm 40 extending upwardly from a brake-applying shaft 42.

Shaft 42 is slidably supported at one end by a sleeve 44 held by tubular flanges formed on inner and outer spherical shells 46 and 48, held by a spring 50 confined between shell 46 and a stop 52 on the sleeve 44. Shells 46 and 48 embrace a spherical part of a stationary support 54 secured to the transmission 26.

At its opposite end, shaft 42 is flattened and perforated to be swivelled by a vertical pin 56 between approximately semi-cylindrical connectors 58 held in a cylindrical bore in the end of a short shaft 60 carrying a double cam 62.

Cam 62 is arranged to force apart, against the resistance of a return spring 64, a reverse shoe 66 and a servo shoe 68, the servo shoe 68 turning with the drum 70 and forcing against the drum a central shoe 72 to which it is pivotally connected at 74. During the initial movement of shoe 68, shoe 72 is held away from the drum by an auxiliary spring 76, insuring smooth and gradual effectiveness of the shoes.

Shoe 66 is anchored at 78 between the ends of shoe 72, and shoe 72 is anchored at 80 between the ends of shoe 66, shoes 66 and 68 preferably being forked to straddle or overlap the ends of shoe 72. Both anchors 78 and 80 may be carried by a backing plate or other support 82 at the open side of the drum. Drum 70 is shown as secured to and rotating with the propeller shaft 28, while support 82 is provided with a tubular projection 84, sleeved for support on a tubular part 86 of the housing of the transmission 26.

When the brake is applied by depressing the pedal, the support 82 is turned in one direction or the other with the drum, shoes 68 and 72 being effective if the vehicle is moving forward and shoe 66 being effective if the vehicle is moving backward. This angular movement is yieldingly limited by two pairs of springs 88 and 90, embracing arms 92 and 94 secured to the support, and confined between upper and lower brackets 96 carried by frame 10.

After support 82 comes to rest, the friction means shown as including shoes 66, 68, and 72 acts as a transmission brake to retard movement of the rear wheels 22 through the propeller shaft 28 and through the differential in the rear axle 14, the differential serving to equalize the retarding effect on the two wheels.

The arms 92 and 94 are connected by links 98 to arms 100 on shaft 20, each link 98 projecting through an opening in the corresponding arm and having an adjustable nut 102 or other stop engaging the bottom of the arm. This constitutes an over-running connection, so that if the drum 70 is turning in one direction the one arm 100 rocks shaft 20, and if the drum is turning in the opposite direction the other arm 100 rocks the shaft, but in either case the shaft 20 applies the front brakes. If desired, a light anti-rattle spring 104 may hold each arm 100 against its stop 102 when the brakes are not applied.

It is important to note that springs 88 and 90 yield in proportion to the depression of pedal 30, and that consequently the pressure on the front brakes, as well as the retarding effect of the transmission brake, is controlled by the pedal. Arm 40 is so formed and so arranged that, when the brakes are on, its joint with link 38 is directly in a vertical axis passing through the universal joint at the transmission end of shaft 42, so that angular movement of support 82, permitted by the universal joints at opposite ends of shaft 42, does not affect the pressure put on the shaft by depression of the pedal.

While one illustrative embodiment has been described in detail, it is not my intention to limit the scope of the invention to that particular embodiment, or otherwise than by the terms of the appended claims.

I claim:

1. A vehicle having, in combination, a transmission and a power shaft extending rearwardly therefrom and driving the vehicle wheels through the differential, a drum rotating with the shaft, a pair of shoes anchored at one end of one shoe within the drum and so connected that the unanchored shoe moves with the drum to force the anchored shoe against the drum to retard movement of the shaft in the direction it turns when the vehicle is moving forward, a third shoe anchored at the opposite end within the drum to retard movement of the shaft in the opposite direction, and means for forcing the third shoe and the unanchored shoe apart against the drum.

2. A vehicle having, in combination, a transmission and a power shaft extending rearwardly therefrom and driving the vehicle wheels through the differential, a drum rotating with the shaft, shoes within the drum and expansible against the drum, an anchor for each of a pair of the shoes between the ends of the other of the pair, and means for expanding the shoes against the drum, including a third one of the shoes arranged to force one of the pair of shoes against the drum.

In testimony whereof I have hereunto signed my name.

LUDGER ELIZÉ LA BRIE.